United States Patent
Vajo et al.

(10) Patent No.: US 7,749,484 B2
(45) Date of Patent: Jul. 6, 2010

(54) LI-B-MG-X SYSTEM FOR REVERSIBLE HYDROGEN STORAGE

(75) Inventors: John J. Vajo, Westhills, CA (US); Gregory L. Olson, Westlake Village, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 1227 days.

(21) Appl. No.: 11/272,575

(22) Filed: Nov. 10, 2005

(65) Prior Publication Data

US 2007/0104642 A1    May 10, 2007

(51) Int. Cl.
*C01B 3/04* (2006.01)
*C09K 3/00* (2006.01)

(52) U.S. Cl. .............................. 423/648.1; 252/183.14; 252/183.16

(58) Field of Classification Search ............... 423/648.1, 423/644, 645, 646, 647; 252/183.14, 183.16
See application file for complete search history.

(56) References Cited

U.S. PATENT DOCUMENTS

| 6,534,033 | B1 | 3/2003 | Amendola et al. ........ 423/648.1 |
| 2005/0191232 | A1 | 9/2005 | Vajo et al. |
| 2006/0046930 | A1* | 3/2006 | Au .............................. 502/400 |
| 2006/0196112 | A1* | 9/2006 | Berry et al. .................. 44/550 |
| 2006/0292064 | A1* | 12/2006 | Wolverton .................. 423/644 |

FOREIGN PATENT DOCUMENTS

| JP | 2004-196634 | * | 7/2004 |
| WO | PCT2005/097671 | | 10/2005 |

OTHER PUBLICATIONS

International Search Report for PCT/US06/38355 dated Apr. 23, 2007 corresponding to this application.
J. Vajo, F. Mertens, F. Mertens, C. Ahn, R. Bowman, Jr., and B. Fultz, Altering Hydrogen Storage Properties by Hydride . . . , J. Phys. Chem. B. 2004, 108, 13977-13983.
J. Vajo, S. Skeith, F. Mertens and S. Jorgensen, Hydrogen-generating solid-state hydride/hydroxide reactions, Journal of Alloys and Compounds 390 (2005) 55-61.
J. Vajo, S. Skeith, and F. Mertens, Reversible Storage of Hydrogen in Destabilized LiBH4, The Journal of Physical Chemistry B Letters 2005, 109, 3719-3722.

* cited by examiner

*Primary Examiner*—Wayne Langel
(74) *Attorney, Agent, or Firm*—Reising Ethington P.C.

(57) ABSTRACT

A material mixture is disclosed for storage of hydrogen for a hydrogen-using device and release of hydrogen on demand of the hydrogen-using device, especially by heating of the mixture. Such a mixture suitably comprises a solid hydrogen-containing lithium compound (e.g. $LiBH_4$) and a solid magnesium compound, MgX, the magnesium compound being reactive with the lithium compound to release hydrogen and yield solid by products containing lithium and X. X may include one or more of F, Cl, OH, O, S, Se, Si, $CO_3$, $SO_4$, Cu, Ge, Ni, (OH)Cl, and $P_2O_7$.

10 Claims, No Drawings

LI-B-MG-X SYSTEM FOR REVERSIBLE HYDROGEN STORAGE

TECHNICAL FIELD

This invention pertains to the storage of hydrogen for release of hydrogen at moderate conditions for power systems such as fuel cells. More specifically, this invention pertains to two-phase materials systems comprising a suitable lithium hydride compound and a magnesium compound that is suitably reactive with the hydrogen-containing lithium compound.

BACKGROUND OF THE INVENTION

A wide range of new and efficient hydrogen-based power systems could be realized if the hydrogen fuel could be stored and released at temperatures and pressures consistent with the ambient operating conditions of the system. For example, military applications include hydrogen storage for stationary and mobile power sources, remote power, and low signature power; aerospace applications include hydrogen for auxiliary fuel cell power; automotive applications include hydrogen for fuel cell and combustion engines; commercial applications include hydrogen for stationary fuel cells for distributed power; and consumer applications include hydrogen for fuel cell powered portable electronic devices. However, it has proven difficult to provide local storage of hydrogen in a form that can be stored and released under moderate conditions.

Relatively low molecular weight metal hydride compounds, rich in hydrogen content, have been identified or synthesized. Such compounds can be viewed as storing hydrogen and thus available as candidates for supplying hydrogen to a hydrogen-powered device. However, the efficient operation of the device requires that the hydrogen is able to be easily and completely released from the compound on demand.

Currently, the most well developed hydride materials for reversible hydrogen storage can store about 7 wt. % hydrogen at ambient temperatures, but they require relatively high temperatures for hydrogen release. Typically such hydrides release most of their hydrogen content at temperatures of about 300° C., but they release only ~5 wt % at 50-150° C., or only ~2 wt. % at near ambient conditions. For example, magnesium hydride can reversibly store up to 7.6 wt. % hydrogen, but a temperature of 280° C. is required for an equilibrium pressure of 1 bar. This temperature is considered too high for most applications. Sodium alanate ($NaAlH_4$) when appropriately catalyzed can yield up to 5.6 wt % hydrogen at temperatures of 50-150° C. Transition metal based materials such as $TiFeH_2$ and $LaNi_5H_6$ yield only ~2 wt. %, although the hydrogen can be evolved and recharged near room temperature.

The hydrogen storage materials described above are generally based on single-phase materials in both the hydrogenated and dehydrogenated states, ie, $MgH_2$ and Mg, $TiFeH_2$ and TiFe, and $LaNi_5H_6$ and $LaNi_5$. Sodium alanate is an exception in which the dehydrogenated state is a two-phase mixture of NaH and Al.

It is an object of this invention to provide a group of two phase hydrogen systems comprising a hydrogen-containing lithium compound and a magnesium compound that permit the storage and release of hydrogen at more moderate conditions.

SUMMARY OF THE INVENTION

This invention provides a hydrogen storage material combination comprising a mixture of a hydrogen-containing lithium compound, such as lithium borohydride ($LiBH_4$), and a magnesium compound for release of the hydrogen by reaction with the lithium hydride. A few examples of suitable magnesium compounds include magnesium fluoride, magnesium chloride and magnesium hydroxide. The lithium compound and the magnesium compound are each of relatively low molecular weight so that the hydrogen represents five percent by weight or more of the two-phase mixture. For example, a mixture containing two chemical equivalents of lithium borohydride and one equivalent of magnesium fluoride yields hydrogen in an amount of about 7.6 weight percent of the mixture when heated to about 150° C. at atmospheric pressure. The reaction is summarized as follows:

$$2LiBH_4 + MgF_2 = 2LiF + MgB_2 + 4H_2$$

Further examples of suitable magnesium compounds may be stated as MgX with X including F, Cl, OH, O, S, Se, Si, $CO_3$, $SO_4$, Cu, Ge, Ni, (OH)Cl and $P_2O_7$.

The mixture of a solid hydrogenated lithium compound and a solid magnesium compound preferably also contains a catalyst to promote the hydrogen-releasing (or hydrogen-storing) reaction. Suitable catalysts include, for example, halogen-containing or hydrogen-containing compounds of titanium, vanadium, nickel, or lanthanum. Further examples of catalysts for the hydrogenation or dehydrogenation include halogen compounds or hydrides of scandium, chromium, manganese, iron, cobalt, copper, yttrium, zirconium, niobium, molybdenum, ruthenium, rhodium, palladium, cerium, neodymium, erbium, or platinum, as well as combinations of one or more of these metals.

The respective materials are provided in the form of a uniform mixture of suitably sized particles. The hydrogen is stored in the hydrogenated lithium compound and released by reaction with the magnesium compound upon demand by heating the mixture to a suitable temperature. While neither the lithium hydride nor the magnesium compound alone serves as suitable hydrogen storage and release materials, the combination provides a very effective two-phase material for hydrogen storage and release.

The component materials of the hydrogen storage mixture, including suitable catalyst, can be prepared as a powder mixture at any suitable fuel preparation installation. But the release of the hydrogen is easily obtained in a storage container on or near the fuel cell or other hydrogen-fueled power device. An additional feature of the invention is that, for many combinations of lithium hydride and magnesium compound, the dehydrogenated by-products can be re-hydrogenated by reaction with hydrogen under suitable pressure and at a suitable temperature.

Other objects and advantages of the invention will become more apparent from a description of some illustrative preferred embodiments.

DESCRIPTION OF PREFERRED EMBODIMENTS

In accordance with preferred embodiments, a material system for reversible hydrogen storage is based on a combination of lithium borohydride ($LiBH_4$) and one or more magnesium compounds, represented generally as MgX, where X is F, Cl, OH, O, S, Se, Si, $CO_3$, $SO_4$, Cu, Ge, Ni, (OH)Cl, or $P_2O_7$, together with an appropriate catalyst. The magnesium compound is not magnesium hydride and preferably does not contain hydrogen. In the hydrogenated state the system is a two-phase mixture of $LiBH_4$ and an MgX compound. In the dehydrogenated state the system is a mixture of the reaction-products including a lithium compound (LiX), or possibly LiH and X, and magnesium diboride ($MgB_2$). Reaction between the phases occurs during hydrogenation and dehydrogenation. The "heart" of the invention is the use of a combination (a two phase mixture) of $LiBH_4$ and one or more MgX compounds. This combination enables reversible storage of approximately 5 to 10 weight percent (wt. %) hydrogen under conditions amenable to commercial transportation applications. Using a combination of $LiBH_4$ and an appropriate Mg compound is an example of the concept of thermodynamic tuning of hydrogen storage properties by alloy formation during dehydrogenation. Alone, neither material can achieve the performance of the combined system. Separately, $LiBH_4$ is not readily reversible. Currently there are no hydrogen storage materials or material systems capable of >5 wt. % reversible storage under moderate conditions. This invention satisfies this need.

In general the conceptual basis for the current invention is two or more phases that interact during hydrogenation and dehydrogenation. Together, the phases constitute a hydrogen storage material system, as opposed to a single-phase hydrogen storage material. The interaction between the phases allows alteration of hydrogen storage properties through compound or alloy formation upon dehydrogenation. For single-phase alloys, changing the alloy composition can alter the hydrogen storage properties. However, with multiple phases larger and more finely tuned alterations are possible. Alone, $LiBH_4$ is not readily reversible and MgX is not an active hydrogen storage material. But the combination of $LiBH_4$ with MgX enables the relatively low weight storage of appreciable amounts of hydrogen and the release of the hydrogen at relatively moderate conditions of temperature and pressure.

Thus, this invention is a material system for reversible hydrogen storage comprising a properly processed and catalyzed combination of $LiBH_4$ and an Mg compound, designated generally as MgX. The basis for this system is the idea of alloy formation upon dehydrogenation to alter hydrogen storage properties. Specific embodiments of this invention are illustrated by the following thermodynamically reversible dehydrogenation-hydrogenation reactions:

$2LiBH_4 + MgF_2 = 2LiF + MgB_2 + 4H_2 (7.6\%) \Delta H = 45$ kJ/mol-$H_2$, T(1 bar)=150° C.     1.

$2LiBH_4 + MgCl_2 = 2LiCl + MgB_2 + 4H_2 (5.8\%) \Delta H = 29$ kJ/mol-$H_2$, T(1 bar)=−10° C.     2.

$2LiBH_4 + Mg(OH)_2 = 2LiOH + MgB_2 + 4H_2 (7.9\%) \Delta H = 61$ kJ/mol-$H_2$, T(1 bar)=290° C.     3.

$2LiBH_4 + MgO = Li_2O + MgB_2 + 4H_2 (9.6\%) \Delta H = 73$ kJ/mol-$H_2$, T(1 bar)=430° C.     4.

$2LiBH_4 + MgS = Li_2S + MgB_2 + 4H_2 (8.0\%) \Delta H = 47$ kJ/mol-$H_2$, T(1 bar)=170° C.     5.

$2LiBH_4 + MgSe = Li_2Se + MgB_2 + 4H_2 (5.4\%) \Delta H = 36$ kJ/mol-$H_2$, T(1 bar)=70° C.     6.

$2LiBH_4 + MgCO_3 = Li_2CO_3 + MgB_2 + 4H_2 (6.3\%) \Delta H = 42$ kJ/mol-$H_2$, T(1 bar)=110° C.     7.

$4LiBH_4 + Mg_2Si = 4LiH + 2MgB_2 + Si + 6H_2 (7.3\%) \Delta H = 49$ kJ/mol-$H_2$, T(1 bar)=230° C.     8.

$2LiBH_4 + MgSO_4 = Li_2SO_4 + MgB_2 + 4H_2 (4.9\%) \Delta H = 34$ kJ/mol-$H_2$, T(1 bar)=50° C.     9.

$4LiBH_4 + Mg_2Cu = 4LiH + 2MgB_2 + Cu + 6H_2 (6.0\%)$ $\Delta H = 41$ kJ/mol-$H_2$, T(1 bar)=150° C.     10.

$4LiBH_4 + Mg_2Ge = 4LiH + 2MgB_2 + Ge + 6H_2 (5.8\%)$ $\Delta H = 53$ kJ/mol-$H_2$, T(1 bar)=270° C.     11.

$4LiBH_4 + Mg_2Ni = 4LiH + 2MgB_2 + Ni + 6H_2 (6.2\%)$ $\Delta H = 47$ kJ/mol-$H_2$, T(1 bar)=190° C.     12.

$2LiBH_4 + Mg(OH)Cl = LiOH + LiCl + 2MgB_2 + 4H_2 (6.7\%)$ $\Delta H = 49$ kJ/mol-$H_2$, T(1 bar)=190° C.     13.

$4LiBH_4 + Mg_2P_2O_7 = Li_4P_2O_7 + 2MgB_2 + 8H_2 (5.2\%)$ $\Delta H = 40$ kJ/mol-$H_2$, T(1 bar)=110° C.     14.

The standard heat of formation and temperature for an equilibrium hydrogen pressure of 1 bar (1 atmosphere) listed next to each reaction were computed using a commercially available thermodynamics calculation program (HSC Chemistry).

The thermodynamic parameters given for the examples listed above provide useful information regarding suitability of a material system for a particular reversible hydrogen storage application. Although appropriate thermodynamics characteristics are essential, it is also necessary to satisfy the constraints imposed by reaction kinetics. That is, even though the thermodynamics parameters suggest that a reaction can proceed at temperatures consistent with a particular hydrogen storage and delivery application, there may be barriers to the reaction kinetics that demand higher operating temperatures. Overcoming those barriers may require, for example, the use of mechanical milling (to achieve more intimate contact between reactants), the use of catalysts (to enhance hydrogen dissociation at the surface of the solid particles and to increase the rate of the hydrogenation reaction within the particles), and/or the use of nanometer particle size reactants (to reduce hydrogen diffusion distances and facilitate hydrogen transport, thereby increasing the net reaction rate).

The individual constituents ($LiBH_4$+MgX) may be individually milled, if necessary, and mixed, or milled and mixed at the same time. Typical milling parameters using, for example, a Fritsch P6 planetary mill include: 400 rpm, 1 hr milling time, 80 $cm^3$ hardened steel vessel, thirty 7 mm diameter Cr-steel balls, and 1.2 g total sample mass. Where dry milling and mixing is not preferred for a combination of constituents, other practices such as solution-based precipitation methods, or approaches based upon direct synthesis of nanoscale (1-100 nm) particles may be used to improve the reaction kinetics. To avoid unwanted agglomeration of nanoparticles during hydrogen sorption cycles it may be necessary to support individual particles in an inert matrix support or scaffold. Rate-enhancing catalysts can also be added to the reaction mixture. In addition, catalysts may be required in order to achieve the desired reaction rates.

Possible catalyst compositions, which may be used in concentrations from 0.1 to 10 atomic percent (based on the catalytic metal atom) include $TiCl_3$, $TiH_2$, TiHx, $TiF_3$, $TiCl_2$, $TiCl_4$, $TiF_4$, $VCl_3$, $VF_3$, VHx, $NiCl_2$, $LaCl_3$. Further examples of catalysts for the hydrogenation or dehydrogenation include halogen compounds or hydrides of scandium, chromium, manganese, iron, cobalt, copper, yttrium, zirconium, niobium, molybdenum, ruthenium, rhodium, palladium, cerium, neodymium, erbium, and platinum, as well as combinations of one or more of these metals. The catalyst could be processed by mechanical milling. Alternative processing techniques include precipitation from solution, vapor phase deposition, chemical transport, or sputter deposition.

Two examples that illustrate reversible storage/release of hydrogen in processed and catalyzed $LiBH_4/MgX$ systems are given here:

EXAMPLE 1

$$2LiBH_4+MgF_2=2LiF+MgB_2+4H_2 \text{ (Reaction 1 Above)}$$

To approximate the molar composition $LiF+0.5MgB_2$, a mixture of 0.583 g of LiF (from Aldrich Chemical, used as-received) and 0.513 g of $MgB_2$ (from Aldrich Chemical, used as-received) was placed in a Fritsch 80 cm³ hardened steel milling vessel under an Ar atmosphere in a glove box. To accelerate the reaction, $TiCl_3$ was added as a catalyst, 0.103 g, 3% molar composition (from Aldrich Chemical, used as-received). Thirty, 7 mm diameter Cr-steel balls were added, and the vessel was sealed with an elastomeric gasket. The mixture was mechanically milled using a Fritsch P6 planetary mill operating at 400 rpm for 1 hr.

After milling, powder x-ray diffraction analysis indicated that the milled mixture was a physical mixture of LiF and $MgB_2$. Because of its low concentration, $TiCl_3$ could not be detected by x-ray diffraction.

After milling, 0.540 g of the mixture was transferred to a sample vessel, which was then connected to a volumetric gas adsorption apparatus and evacuated to a pressure of $5.8 \times 10^{-8}$ Torr. Following pressurization with hydrogen gas to 100 atmospheres, the sample was heated to 350° C. at a rate of 2° C./min. The sample temperature was then held constant for 3 hr. Monitoring of the gas pressure during heating indicated that hydrogen absorption of 6.5 weight percent with respect to the combined weights of the LiF and the $MgB_2$ had occurred. After hydrogen absorption, x-ray analysis indicated that the $LiF+0.5MgB_2$ had transformed into $LiBH_4+0.5MgF_2$. The absorption of hydrogen indicates that hydrogen can be stored in the $LiF+MgB_2$ system.

After cooling the sample to room temperature and evacuating the hydrogen gas, the sample was pressurized with 3.7 atmospheres of hydrogen and heated in a closed volume of approximately 165 cm³. An initial hydrogen overpressure of 3.7 atmospheres was used to determine if hydrogen could be desorbed into an overpressure typically used in hydrogen storage applications. The evolved hydrogen was monitored with a pressure gauge. The sample was heated to 450° C. at 2° C./min and then held at 450° C. for 2 hr. During heating the pressure increase indicated desorption of 5.5 weight percent hydrogen with respect to the original combined weight of the LiF and the $MgB_2$. After hydrogen desorption, x-ray analysis indicated that LiF and $MgB_2$ had re-formed although there was some remaining $MgF_2$ and some Mg metal. The desorption of hydrogen indicates that hydrogen can be recovered from the hydrogenated $LiF+0.5MgB_2$ system.

EXAMPLE 2

$$2LiBH_4+MgS=Li_2S+MgB_2+4H_2 \text{ (Reaction 5 Above)}$$

To approximate the molar composition $Li_2S+MgB_2$, a mixture of 0.547 g of $Li_2S$ (from Aldrich Chemical, used as-received), 0.549 g of $MgB_2$ (from Aldrich Chemical, used as-received) was placed in a Fritsch 80 cm³ hardened steel milling vessel under an Ar atmosphere in a glove box. To accelerate the reaction $TiCl_3$ was added as a catalyst 0.111 g, 3% molar composition with respect to Li (from Aldrich Chemical, used as-received). Thirty, 7 mm diameter Cr-steel balls were added and the vessel sealed with an elastomeric gasket. The mixture was mechanically milled using a Fritsch P6 planetary mill operating at 400 rpm for 1 hr. After milling, powder x-ray diffraction analysis indicated that the milled mixture was a physical mixture of $Li_2S$ and $MgB_2$. The $TiCl_3$ could not be detected by x-ray because of its low concentration. After milling, 1.028 g of the mixture was transferred to a sample vessel, which was then connected to a volumetric gas adsorption apparatus and evacuated to a pressure of $1.1 \times 10^{-7}$ Torr. Following pressurization with hydrogen gas to 100 atmospheres, the sample was heated to 350° C. at a rate of 2° C./min. The sample temperature was then held constant at 350° C. for 3 hr. Monitoring of the gas pressure during heating indicated that hydrogen absorption of 6.1 weight percent, with respect to the combined weights of the $Li_2S$ and the $MgB_2$, had occurred. After hydrogen absorption, x-ray analysis indicated that the $Li_2S+MgB_2$ had transformed into $LiBH_4+MgS$. The absorption of hydrogen indicates that hydrogen can be stored in the $Li_2S+MgB_2$ system.

After cooling the sample to room temperature and evacuating the hydrogen gas, the sample was heated in a closed volume of approximately 165 cm³. The evolved hydrogen was monitored with a pressure gauge. The sample was heated to 450° C. at 2° C./min and then held at 450° C. for 2 hr. During heating, the pressure increase indicated desorption of 4.2 weight percent hydrogen, with respect to the original combined weight of the $Li_2S$ and the $MgB_2$. After hydrogen desorption, x-ray analysis indicated that $Li_2S$ and $MgB_2$ had re-formed although there was some remaining MgS. The desorption of hydrogen indicates that hydrogen can be recovered from the hydrogenated $Li_2S+MgB_2$ system.

The practice of the invention has been illustrated in terms of certain specific examples but it is recognized that other forms and practices of the invention could be devised by one skilled in the art. The invention is not limited to the examples.

The invention claimed is:

1. A material mixture for storage of hydrogen for a hydrogen-using device and release of hydrogen on demand of the hydrogen-using device by heating of the mixture, the mixture comprising:

$LiBH_4$ and one or more magnesium compounds selected from the group consisting of $MgF_2$, $MgCl_2$, MgO, MgS, MgSe, $Mg_2Si$, $MgCO_3$, $MgSO_4$, MgCu, MgGe, MgNi, Mg(OH)Cl, and $Mg_2P_2O_7$, the molar proportions of the $LiBH_4$ and one or more magnesium compounds being such that substantially all of the hydrogen from the $LiBH_4$ is capable of being released by chemical reaction between them.

2. A material mixture as recited in claim 1 in which the $LiBH_4$ and one or more magnesium compounds are reactive to release hydrogen for the hydrogen-using device and to form solid by-products, the solid by-products being subsequently reactable with hydrogen to regenerate the $LiBH_4$ and one or more magnesium compounds.

3. A material mixture as recited in claim 1 in which the material mixture comprises a catalyst for the reaction between the $LiBH_4$ and one or more magnesium compounds.

4. A material mixture as recited in claim 2 in which the material mixture comprises a catalyst for the reaction between the $LiBH_4$ and one or more magnesium compounds.

5. A material mixture as recited in claim 3 in which the catalyst comprises one or more halogen-containing or hydrogen-containing compounds of cerium, chromium, cobalt, copper, erbium, iron, lanthanum, manganese, molybdenum, neodymium, nickel, niobium, palladium, platinum, rhodium, ruthenium, scandium, titanium, vanadium, yttrium, or zirconium.

6. A material mixture as recited in claim 4 in which the catalyst comprises one or more halogen-containing or hydrogen-containing compounds of cerium, chromium, cobalt, copper, erbium, iron, lanthanum, manganese, molybdenum, neodymium, nickel, niobium, palladium, platinum, rhodium, ruthenium, scandium, titanium, vanadium, yttrium, or zirconium.

7. A material mixture as recited in claim 1 in which the material mixture comprises a halogen-containing or hydrogen-containing compound of titanium as a catalyst for the reaction between the $LiBH_4$ and one or more magnesium compounds.

8. A method of supplying hydrogen to a hydrogen-using device, the method comprising:

storing, in the vicinity of the device, a material mixture comprising $LiBH_4$ and one or more magnesium compounds selected from the group consisting of $MgF_2$, $MgCl_2$, MgO, MgS, MgSe, $Mg_2Si$, $MgCO_3$, $MgSO_4$, MgCu, MgGe, MgNi, Mg(OH)Cl, and $Mg_2P_2O_7$ to release hydrogen for the hydrogen-using device and the molar proportions of the $LiBH_4$ and the one or more magnesium compounds being determined for release by chemical reaction between them of substantially all of the hydrogen from the $LiBH_4$; and heating the mixture, upon a need of the device for hydrogen, to release hydrogen from the mixture; and delivering released hydrogen to the hydrogen-using device.

9. A method as recited in claim 8 in which the $LiBH_4$ and the one or more magnesium compounds are reactive to release hydrogen for the hydrogen-using device and to form solid by-products, the solid by-products being subsequently reactable with hydrogen to regenerate the $LiBH_4$ and the one or more magnesium compounds.

10. A method as recited in claim 9 further comprising reacting hydrogen with the solid by-products to regenerate the $LiBH_4$ and the one or more magnesium compounds.

* * * * *